(12) United States Patent
Hayes et al.

(10) Patent No.: US 7,811,470 B2
(45) Date of Patent: Oct. 12, 2010

(54) WATER BASED COLORANTS COMPRISING SEMICONDUCTOR NANOCRYSTALS AND METHODS OF MAKING AND USING THE SAME

(75) Inventors: James Hayes, Homer, NY (US); Luis Sanchez, Troy, NY (US)

(73) Assignee: Evident Technologies, Troy, NY (US)

( * ) Notice: Subject to any disclaimer, the term of this patent is extended or adjusted under 35 U.S.C. 154(b) by 532 days.

(21) Appl. No.: 11/867,438

(22) Filed: Oct. 4, 2007

(65) Prior Publication Data

US 2008/0083907 A1 Apr. 10, 2008

Related U.S. Application Data

(60) Provisional application No. 60/849,174, filed on Oct. 4, 2006.

(51) Int. Cl.
*C09K 11/02* (2006.01)
*C09K 11/08* (2006.01)
*C09D 11/02* (2006.01)
*C09D 129/04* (2006.01)

(52) U.S. Cl. .................. 252/301.36; 252/301.4 R; 252/301.6 S; 106/31.64; 106/452; 106/400; 106/420; 977/813; 977/814; 977/815; 977/816; 977/817; 977/819; 977/820; 977/821; 977/822; 977/823; 977/824; 977/834; 977/786; 977/787; 977/961; 977/950

(58) Field of Classification Search .......... 252/304.1 R, 252/301.6 S, 301.36; 106/31.64, 452, 400, 106/420; 977/813–824, 834, 786, 787, 961, 977/950; 516/53, 73, 72
See application file for complete search history.

(56) References Cited

U.S. PATENT DOCUMENTS

| | | | |
|---|---|---|---|
| 6,110,266 A | 8/2000 | Gonzalez-Blanco et al. | |
| 6,251,303 B1 | 6/2001 | Bawendi et al. | |
| 6,337,117 B1 * | 1/2002 | Maenosono et al. | 428/64.1 |
| 6,576,155 B1 * | 6/2003 | Barbera-Guillem | 252/301.36 |
| 2005/0227096 A1 * | 10/2005 | Harding et al. | 428/457 |

FOREIGN PATENT DOCUMENTS

WO 2004114204 A1 12/2004

OTHER PUBLICATIONS

Mandel et al., "Encapsulation of Magnetic and Fluorescnet Nanoparticles in Emulsion Droplets", Langmuir, 21, pp. 4175-4179, Mar. 24, 2005.*
International Preliminary Report on Patentability PCT/US2007/080436, filed Oct. 4, 2007.

* cited by examiner

*Primary Examiner*—C. Melissa Koslow
(74) *Attorney, Agent, or Firm*—Hoffman Warnick LLC

(57) ABSTRACT

A water based colorant that includes a polymer emulsion and semiconductor crystals capable of emitting light. The colorants include paints, inks and/or dyes can be applied to various substrates.

9 Claims, 4 Drawing Sheets

Water based emulsion
After application to substrate and drying

Fig. 3

Table 1

| | | Hydrophobic phase (0.10 g) | | Aqueous phase (0.90 g) | | | Solution fluorescence Activity | Sunlight fluorescence Activity (days) |
|---|---|---|---|---|---|---|---|---|
| | | Dots | Toluene | Water | PVOH (Celvol) | Vikan XX210 | | |
| 27-E | | 50 % (0.05g) | 50 % (0.05g) | 90 % (0.81g) | 10 % (0.09g) C603 | - | Y | 30 + |
| 27-F | | 50 % (0.05g) | 50 % (0.05g) | 90 % (0.81g) | 10 % (0.09g) C107 | - | Y | 30 + |
| 27-G | | 50 % (0.05g) | 50 % (0.05g) | 90 % (0.81g) | 10 % (0.09g) C125 | - | Y | 30 + |
| 27-K | | 50 % (0.05g) | 50 % (0.05g) | 50 % (0.45g) | - | 50 % (0.45 g) V210 | Y | 30 |

Fig. 4

Table 2

| RPM | Time |
|---|---|
| 1500 | 1 min |
| 2500 | 1 min |
| 3500 | 1 min |
| 4500 | 1 min |
| 5500 | 15 min |
| 3500 | 1 min |
| 1500 | 1 min |

US 7,811,470 B2

WATER BASED COLORANTS COMPRISING SEMICONDUCTOR NANOCRYSTALS AND METHODS OF MAKING AND USING THE SAME

CROSS-REFERENCE TO RELATED APPLICATIONS

The present invention claims priority to U.S. Provisional Application No. 60/849,174, filed Oct. 4, 2006 which is incorporated by reference herein.

FIELD OF THE INVENTION

The present invention relates to colorants, in the form of emulsions, that comprise semiconductor nanocrystals. The present invention further relates to methods of preparing colorants comprising semiconductor nanocrystals and method of using such colorants.

BACKGROUND OF THE INVENTION

Anti-counterfeiting technology is continually being developed and improved. Such technology traditionally seeks to impregnate products with ink, dye, codes, etching, or other tagging that somehow marks the item as unique and allows it to be distinguished from imitation items. Unfortunately, the profits associated with counterfeit products ensure that new methods are constantly being developed by the underground community to thwart anti-counterfeiting technology. Because of this interplay, new and better anti-counterfeiting technology is always in demand.

SUMMARY OF THE INVENTION

In certain embodiments, the present invention provides for a water-based colorant comprising an emulsion of a hydrophobic phase and an aqueous phase. The hydrophobic phase includes semiconductor nanocrystals capable of emitting light that are dispersed in a hydrophobic solvent and the aqueous phase includes polymers having hydrophilic functional groups that interact with the aqueous phase and hydrophobic moieties that interact with the hydrophobic phase.

Semiconductor nanocrystals are typically prepared in a non-polar solvent, such as toluene, owing to the hydrophobic moieties comprising the ligands that envelop the nanocrystals. However, for many applications, the semiconductor nanocrystals need to be water-stable, such as for water-based colorants. Semiconductor nanocrystals in their standard format cannot simply be dispersed into an aqueous solvent without first modifying, altering, or exchanging the ligands present on the nanocrystal surface. Ligands terminating in polar or ionizable moieties are required. Furthermore, the oxidative nature of aqueous solvents and oxygen diffusion from the atmosphere to the nanocrystals in a colorant after application and under sunlight exposure could quench the fluorescence of the semiconductor nanocrystals over time.

In certain embodiments, a water-based colorant incorporating semiconductor nanocrystals is derived by adding to an aqueous solvent, semiconductor nanocrystals dispersed in a hydrophobic solvent. Certain polymers having a plurality of polar or ionizable groups are added to the aqueous solvent and the resultant mixture is emulsified. The polymers are preferably selected such that at least some act as a compatibilizer which prevents the hydrophobic solvent from readily separating from the aqueous solvent. Furthermore, after application of the colorant to a substrate and subsequent drying, the plurality of polymers preferably act as a binder that adheres to the surface of a substrate as well as holds (encapsulates) the nanocrystals.

Specifically, in certain embodiments the present invention provides a water-based colorant comprising an emulsion comprising a plurality of droplets dispersed in an aqueous phase. The droplets comprise semiconductor nanocrystals dispersed in a hydrophobic liquid and the aqueous phase comprises a plurality of polymers preferably having the above-described properties. In a preferred embodiment, the plurality of polymers is a polyvinyl acetate polymer; a polyvinyl alcohol polymer; a polyacrylic acid or ester therof; or a co-polymer thereof.

In certain other embodiments, the present invention provides methods of using a water-based colorant by applying the colorant to a substrate.

BRIEF DESCRIPTION OF THE DRAWINGS

FIG. 3, referred to as Table 1, depicts four variations of formulations given in Example 1.

FIG. 4, referred to as Table 2, demonstrates settings used for mixing in Example 2.

DETAILED DESCRIPTION OF THE INVENTION

Figure 1:
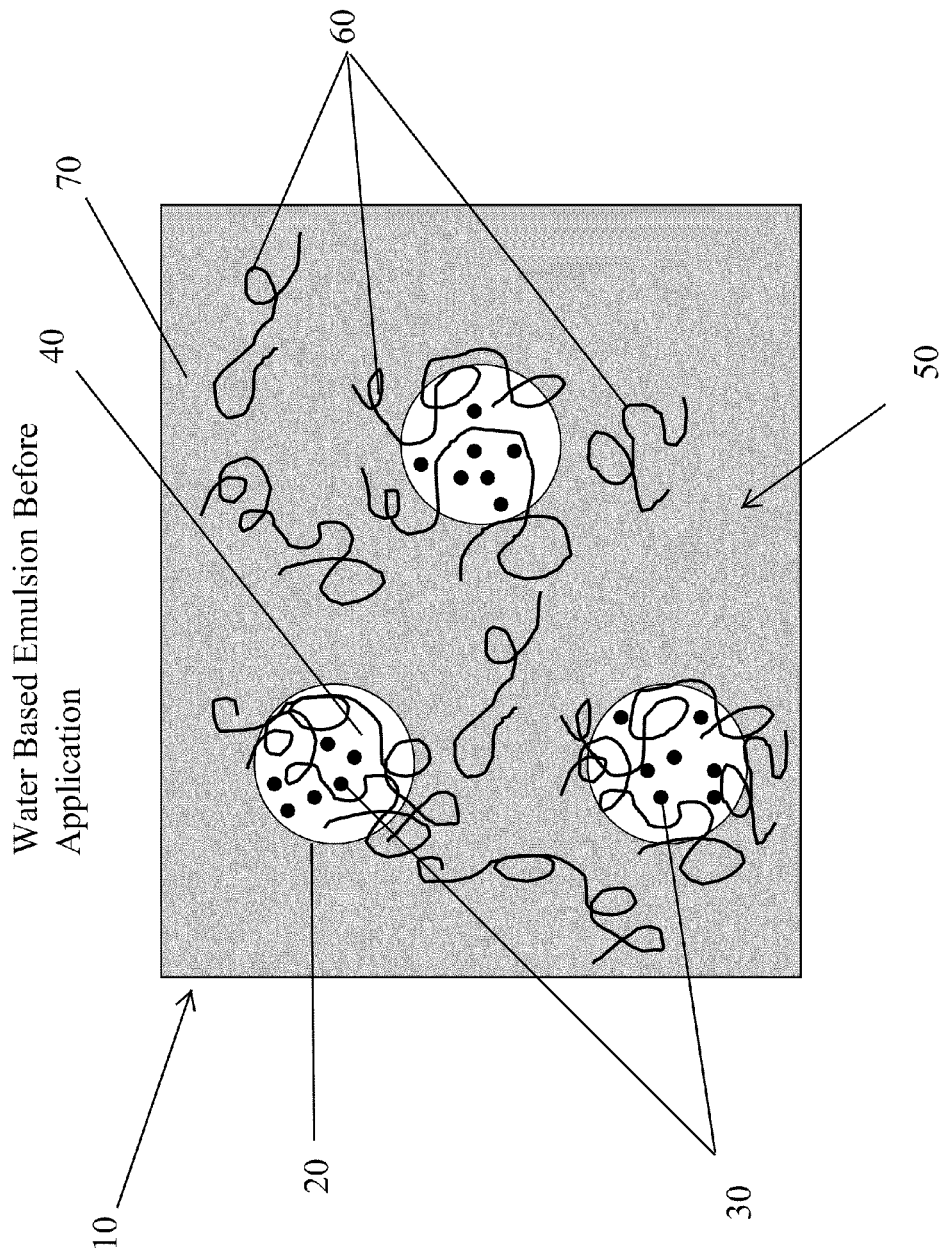
FIG. 1 provides a schematic illustration of a water-based colorant before application to a substrate.

The present invention provides for a water-based colorant comprising semiconductor nanocrystals. As used herein a "colorant" includes a paint, ink or dye. According to certain embodiments of the present invention and referring to FIG. 1, a water-based colorant 10 comprises an emulsion comprising a plurality of droplets 20 dispersed in an aqueous phase 50. The droplets comprise semiconductor nanocrystals 30 dispersed in a hydrophobic liquid 40 ("the hydrophobic phase") and the aqueous phase 50 comprises a plurality of polymers, at least some of which preferably act as a compatibilizer which prevents the hydrophobic phase from readily separating from the water in the aqueous phase. By "readily separate" means the hydrophobic phase does not separate from the aqueous phase absent artificial means imposed on the hydrophobic phase to intentionally separate the hydrophobic phase from the aqueous phase. Furthermore, after application of the colorant to a substrate and subsequent drying, the plurality of polymers preferably act as a binder that adheres to the surface of a substrate as well as holds (encapsulates) the nanocrystals.

In a preferred embodiment, the plurality of polymers do not substantially quench fluorescence of the semiconductor nanocrystals and inhibit the diffusion of oxygen from the atmosphere to the nanocrystals after the colorant is applied to a surface and the water and hydrophobic solvents surrounding the nanocrystals are dried off. In a preferred embodiment, the polymers are a polyvinyl acetate polymer; a polyvinyl alcohol polymer; a polyacrylic acid polymer or ester thereof; a copolymer of a polyvinyl acetate polymer and a polyvinyl alcohol polymer; or other co-polymers thereof. By "polyvinyl acetate polymer" is meant a polymer made by polymerizing a compound of formula:

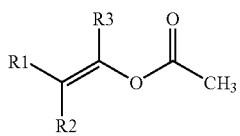

wherein $R_1$ to $R_3$ is a hydrophobic moiety including, but not limited to, a hydrogen; or an alkyl such as alkanes, alkynes, and alkenes, each of which may be straight chained, branched, or cyclic. In one embodiment, the alkyl is a $C_1$ to $C_{12}$ alkyl. In another embodiment, the alkyl is a $C_1$ to $C_6$, and in another embodiment, the alkyl is a $C_1$ to $C_3$.

By "polyvinyl alcohol polymer" is meant a polymer made by polymerizing a compound of formula:

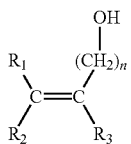

wherein n=0 or 1, $R_1$ to $R_3$ is a hydrophobic moiety including, but not limited to, a hydrogen; or an alkyl such as alkanes, alkynes, and alkenes, each of which may be straight chained, branched, or cyclic. In one embodiment, the alkyl is a $C_1$ to $C_{12}$ alkyl. In another embodiment, the alkyl is a $C_1$ to $C_6$, and in another embodiment, the alkyl is a $C_1$ to $C_3$. In a preferred embodiment, n=0.

By "polyacrylic acid polymer" is meant a polymer made by polymerizing a compound of formula:

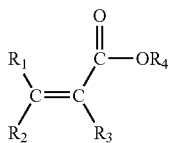

wherein $R_1$ to $R_4$ is a hydrophobic moiety including, but not limited to, a hydrogen; or an alkyl such as alkanes, alkynes, and alkenes, each of which may be straight chained, branched, or cyclic. In one embodiment, the alkyl is a $C_1$ to $C_{12}$ alkyl. In another embodiment, the alkyl is a $C_1$ to $C_6$, and in another embodiment, the alkyl is a $C_1$ to $C_3$. Preferably, $R_4$ is a hydrogen.

Figure 2:
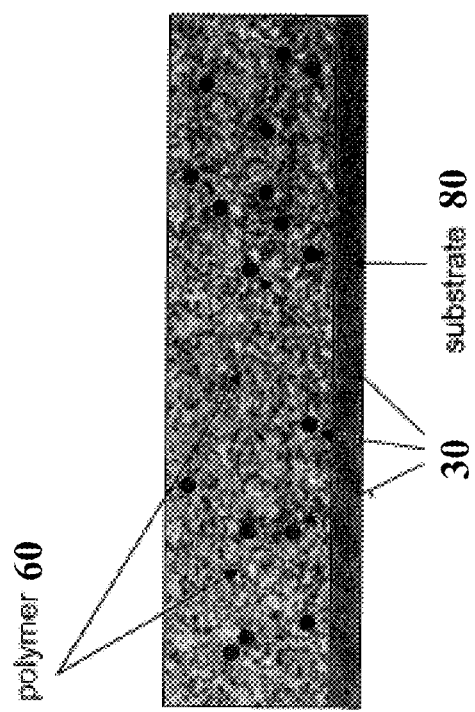
FIG. 2 provides a schematic illustration of a water-based colorant after application to a substrate and after drying.

Although not wishing to be bound by theory, it is believed that at least some of the polymers 60 in the aqueous phase 50 interact with the droplets 20 to form structures 70 as illustrated in FIG. 1. Further not wishing to be bound by theory, it is believed that the semiconductor nanocrystals 30 are dispersed in the polymers 60 as shown in the schematic illustration of FIG. 2 after application to a substrate 80 and drying.

The semiconductor nanocrystals (often referred to as "quantum dots") of the hydrophobic phase of emulsions of the present invention, are crystals of semiconductor materials that have a diameter between 1 nanometer (nm) and 20 nm. The semiconductor nanocrystals comprise a core semiconductor nanocrystal, which may be spherical nanoscale crystalline materials (although oblate and oblique spheroids can be grown as well as rods and other shapes and may be considered semiconductor nanocrystals) having a diameter of less than the Bohr radius for a given material and are typically II-VI, III-V, or IV-VI semiconductors. Non-limiting examples of semiconductor materials that semiconductor nanocrystal cores can comprise include ZnS, ZnSe, ZnTe, CdS, CdSe, CdTe, HgS, HgSe, HgTe (II-VI materials), PbS, PbSe, PbTe (IV-VI materials), AlN, AlP, AlAs, AlSb, GaN, GaP, GaAs, GaSb, InN, InP, InAs, InSb (III-V materials). In addition to binary semiconductors, semiconductor nanocrystal cores may comprise ternary semiconductor materials or quaternary semiconductor materials and may include I-III-VI materials.

A semiconductor nanocrystal core may have an overcoating shell that comprises a semiconductor material having a bulk bandgap greater than that of semiconductor nanocrystal core. In such an embodiment, the shell may act to passivate the outer surface of semiconductor nanocrystal core.

In the strong confinement limit, the physical diameter of the nanocrystal is smaller than the bulk excitation Bohr radius causing quantum confinement effects to predominate. In this regime, the nanocrystal is a 0-dimensional system that has both quantized density and energy of electronic states where the actual energy and energy differences between electronic states are a function of both the nanocrystal composition and physical size. Larger nanocrystals have more closely spaced energy states and smaller nanocrystals have the reverse. Because interaction of light and matter is determined by the density and energy of electronic states, many of the optical and electric properties of nanocrystals can be tuned or altered simply by changing the nanocrystal geometry (i.e. physical size).

Single nanocrystals or monodisperse populations of nanocrystals exhibit unique optical properties that are size tunable. Both the onset of absorption and the photoluminescent wavelength are a function of nanocrystal size and composition. The nanocrystals will absorb all wavelengths shorter than the absorption onset, however, photoluminescence will always occur at the absorption onset. The bandwidth of the photoluminescent spectra is due to both homogeneous and inhomogeneous broadening mechanisms. Homogeneous mechanisms include temperature dependent Doppler broadening and broadening due to the Heisenberg uncertainty principle, while inhomogeneous broadening is due to the size distribution of the nanocrystals. The narrower the size distribution of the nanocrystals, the narrower the full width at half maximum (FWHM) of the resultant photoluminescent spectra.

The above semiconductor nanocrystal properties can be exploited to construct a taggant which makes use of the permutations of precise emission wavelengths available to semiconductor nanocrystals. Given the intricate factors which control both emission intensity and wavelength, including size, composition, and excitation frequency; any anti-counterfeiting mechanism comprising semiconductor nanocrystals are difficult to duplicate, without possessing both exact knowledge and technical understanding of each of the above factors. Such knowledge is hard to empirically determine, and could conceivably vary from product to product, making illegal duplication of semiconductor nanocrystal marked products an expensive and time-consuming enterprise worth little even in the unlikely event of success.

Aspects of semiconductor nanocrystals that allow for them to act as an encrypting device are their narrow and specifiable emission peaks, and their excitation wavelength dependent emission intensity. With these traits, several different sizes or material systems (and therefore emission wavelengths) of semiconductor nanocrystal can be combined with several different wavelengths of excitation light in order to create a wide variety of emission spectra.

The emission peak of a semiconductor nanocrystal complex is determined based upon the semiconductor materials contained in the nanocrystal and the size of the corresponding nanocrystal. If semiconductor nanocrystals with different emission peaks are mixed together in known quantities, the resulting emission spectrum contains each emission peak present at some measurable intensity. This intensity will be dependent on both the quantity of nanocrystal present and the excitation intensity (or intensities, if several sources are used). By fabricating materials containing predetermined amounts of semiconductor nanocrystals which emit at arbitrary wavelengths, and then establishing their emission spectra at arbitrary excitation wavelengths, one can create a "code" based on the relative intensities of emission peaks. For example, if one combines equal amounts of 1000 nm, 1500 nm, and 2000 nm emitting semiconductor nanocrystals, and excites them at 800 nm; it would yield a different spectral code than equal amounts of 1100 nm, 1600 nm, and 2100 nm emitting semiconductor nanocrystals excited at 900 nm.

For many applications, it is often desirable to have semiconductor nanocrystals that do not emit light in the visible range upon excitation. Thus, the semiconductor nanocrystal of the present invention could be prepared such that they emit light in the infrared region. The infrared radiation is electromagnetic radiation of a wavelength longer than that of visible light, but shorter than that of microwave radiation. PbS, PbSe, InGaP, CuInGaSe, InSb core and core/shell semiconductor nanocrystals have been used for the preparation of infrared emitting semiconductor nanocrystals. Infrared emitting semiconductor nanocrystals as well as visible emitting nanocrystals may be used for the purpose of the present invention.

One problem in taking advantage of the unique optical properties of semiconductor nanocrystals is that they are chemically unstable and readily oxidized. That is, semiconductor nanocrystals tend to fade over time when exposed to the oxygen present in the atmosphere and sunlight. Specifically, oxidation results in non-radiative states formed on the nanocrystal surface that quench fluorescence and in some extreme cases total destruction of the nanocrystals altogether. Oxidation is particularly pronounced when the nanocrystals are exposed to both sunlight and oxidative environments. However, the use of semiconductor nanocrystals in a colorant application, such as paint, necessitates exposure to ambient light and atmospheric conditions. Furthermore, in the case of paints at least, most applications require the paint must be water based. Aqueous solvents tend to be oxidative and therefore present a particular challenge when nanocrystals must be added. Thus, it is desirable to create a formulation of semiconductor nanocrystals that may be applied to a substrate as a colorant that tends not to fade over time.

The present invention provides for an emulsion comprising semiconductor nanocrystals and specific water soluble polymers that may be easily applied to a substrate and allow for the semiconductor nanocrystal to attach, stick or remain on an article once applied. Preferably, the polymers protect the semiconductor nanocrystals from degradation over time. This emulsion may be used as a general carrier of semiconductor nanocrystals for both single and for mixed frequencies to tag objects that may or may not be exposed directly to sun light.

The emulsions of the present invention may be prepared as follows:

First, fluorescent core or core/shell semiconductor nanocrystals may be prepared using known techniques known in the art. Non-limiting examples of fluorescent nanocrystals include PbS, PbSe, PbTe, CdS, CdSe, CdTe, InP, InGaP, CuInGaSe, CuInGaS, ZnS, ZnSe, InSb and other II-VI, III-V, I-III-VI, IV-VI semiconductors or alloys thereof. For purposes of the below description, the emulsion comprises at least two parts, the hydrophobic phase and the aqueous phase. The hydrophobic phase comprises one or more populations of semiconductor nanocrystals dispersed in a solvent, such as toluene. Appropriate amounts of solvent may be added to the hydrophobic phase to bring the dispersion to the appropriate dilution. Additionally, it is appreciated that although the experiments described below utilize only a single population of semiconductor nanocrystal core, more than one population of semiconductor nanocrystal may be added to the same emulsion. When referring to more than one type of semiconductor nanocrystal this may mean either a different wavelength emission nanocrystal or a different semiconductor nanocrystal composition.

Once prepared and/or diluted, the hydrophobic phase may be added to the aqueous phase comprising water and a water soluble polymer that also protects the semiconductor nanocrystals, such as a polyvinyl acetate polymer, a polyvinyl alcohol polymer, and/or a co-polymer of a polyvinyl alcohol polymer and a polyvinyl acetate polymer. A preferred viscosity for paint applications is between 3000-7000 cP and for flexographic ink applications the viscosity is between 500-800 cP. The resultant mixture is then emulsified by vigorous mixing via high speed shear flow mixers, sonicators, or other means.

Once prepared, the emulsion may be applied to a substrate and exposed to sunlight without significant fading. In certain embodiments, the emulsion is applied as a colorant directly to a substrate. Non-limiting examples of substrates include metal, glass, plastic, plastic film, textiles, wood, concrete, an article of clothing, or another object in need of detecting. A surfactant may assist the emulsions spreading onto the substrate. Non-limiting examples of surfactants include 10% SDS, Triton X-405, 70% solution Cetyltrimethylammonium Bromide, Tego Foamex 810, Tego Foamex 842, Tego Foamex 845, Pluronic L92, Pluronic L61, Igepal CA-520, Triton X-114, Glascol LS16, Integrity 1300D, Integrity 1100D, Glascol LS20, Tergitol 15-S-9, Tergitol 15-S-12, Tergitol 15-S-7, Magiesol 40, Tego Glide A 115, Tego Twin 4000, Pluronic F68 Pastille, Tego Dispers 655, Nuosperse, FSI-1253 Matte UV Coating, Tergitol 15-S-30, Tween 60, Tween 40, Terigol XJ, Dowfax 2A1 Solution, BRIJ 56, BRIJ 58, BRIJ 72, BRIJ 721, Novec FC-4432. Additionally, since the emulsions as prepared are all water based, they may be added to other water-based colorants such that these colorants are easily applied to many substrates or articles. Additionally, the emulsions could be further diluted with water to meet application requirements for paints, inks or dyes. With respect to inks, in a preferred embodiment, the ink is used for flexographic printing or screen printing.

Preferably, the semiconductor nanocrystal complexes should not substantially fade when exposed to sunlight for more than five days. More preferably, the semiconductor nanocrystals should not substantially fade when exposed to sunlight for more than four weeks. Most preferably, the semiconductor nanocrystals should not substantially fade when exposed to sunlight for more than three months. The term "substantially fade" refers to a reduction in the quantum yield of the emulsion by at least 20%. For instance, the water-based colorant with semiconductor nanocrystals may be detected after 30 days, or more preferably after 90 days.

EXAMPLE 1

Each of the four described examples comprises an aqueous phase and a hydrophobic phase. The hydrophobic phase of each of the examples was made as follows:

First, PbS semiconductor nanocrystal cores in toluene were prepared that emit light at $\lambda=789$ nm upon excitation (31 mg/mL). The hydrophobic phase was formed by adding toluene to 31 mg/ml PbS nanocrystals in toluene solution. Table 1 sets forth the formulations for the amounts and percentage details. It is appreciated that these examples are only exemplary and that variations in the amount of solvent added to the semiconductor nanocrystals may vary. The pH of the solution might be adjusted to 8.5 with 1% ammonium hydroxide solution if necessary depending on the pH of the solution after preparation of the hydrophobic phase.

The aqueous phase was prepared by adding a latex material to water. The latex can protect the nanocrystals from degradation in sunlight. For purposes of the present examples, four types of latexes: vinyl acetate and three types of polyvinyl alcohols, were each added to water to prepare the water phase of the emulsion. The three polyvinyl alcohols were: Celvol 103 and Celvol 107, which are fully hydrolyzed and Celvol 125, which is considered as super hydrolyzed. The amount of the polyvinyl alcohol (as described in Table 1) for each of the examples was 90% water and 10% polyvinyl alcohol. For the example, the ratio of vinyl acetate to water in the latex was 1:1 in each case. It is appreciated that the ratios used for purposes of the experiments are not intended as limiting and are merely exemplary.

In order to prepare the emulsions of this example, the aqueous and hydrophobic phases were mixed with a sonicator. For purposes of each of the four emulsions, 90% by weight of the aqueous phase was mixed with 10%, by weight, of the hydrophobic phase. Specifically, each of the emulsions was made with 0.10 g of the hydrophobic phase and 0.90 g of the aqueous phase. The mixing was done with a high speed vortex and sonicated for 4 minutes (10 seconds on, 10 seconds off at 50% amplitude) with a Branson 450 sonicator. Once mixed, several drops of the four emulsions were spread on microscope slides and subjected to artificial sunlight illumination to determine the onset of photo bleaching. The illumination setting with a Q-Sun Xenon test chamber was: 0.55 W/m$^2$ at 340 nm, chamber temperature range of 28-45 C, and relative humidity range of 30-50%. The IR fluorescence activity was determined under UV or black light illumination for the emulsions as well as the sunlight exposed micro slides.

As indicated on Table 1, each of the tested materials showed significant fluorescence after 30 days. In fact, each of the slides showed fluorescent activity after ninety days. Additionally, each of the four examples tended not to substantially fade when exposed to sunlight over time.

EXAMPLE 2

Another example of the present invention is a method of mixing the aqueous and hydrophobic phases of an emulsion using a paint mixer. In this example the same PbS nanocrystals as described in Example 1 are used. These were mixed in order to form a polyvinyl acetate based paint. The ratios of polyvinyl acetate (PVAc), water, nanocrystals, and toluene found most effective were: 55% PVAc (Vinac xx210), 19% water, 5% PbS nanocrystals, and 21% Toluene. These chemical ingredients were mixed with a Ross Model No. HSM-100LCI high sheer mixer at the settings shown in Table 2 using the RPM settings and amount of time for each shown.

Although the above described examples are for the addition of one type of semiconductor nanocrystal, it is appreciated that more than one wavelength or type of semiconductor nanocrystal may be added to the emulsions described. For example, it may be desirable to have more than one emission wavelength. In such a case, two or more different types of semiconductor nanocrystal cores emitting at two or more different wavelengths may be added to the emulsion as described above or two or more different wavelengths of the same type of semiconductor nanocrystal core may be added to the lacquer.

The foregoing description and examples have been set forth merely to illustrate the invention and are not intended as being limiting. Each of the disclosed aspects and embodiments of the present invention may be considered individually or in combination with other aspects, embodiments, and variations of the invention. Further, while certain features and embodiments of the present invention may be shown in only certain figures, such features can be incorporated into other embodiments shown in other figures while remaining within the scope of the present invention. In addition, unless otherwise specified, none of the steps of the methods of the present invention are confined to any particular order of performance. Modifications of the disclosed embodiments incorporating the spirit and substance of the invention may occur to persons skilled in the art and such modifications are within the scope of the present invention. Further, it is appreciated that although a number of problems and deficiencies may be identified above with respect to the prior emulsions containing semiconductor nanocrystals, each embodiment of the present invention may not solve each problem identified in the art.

Additionally, to the extent a problem identified in the art or an advantage of the present invention is not cured, solved or lessened by the claimed invention, the solution to such problems or the advantage identified above should not be read into the claimed invention. Furthermore, all references cited herein are incorporated by reference in their entirety.

We claim:

1. A water-based colorant comprising: an emulsion comprising a plurality of droplets dispersed in an aqueous phase wherein the droplets comprise semiconductor nanocrystals dispersed in a hydrophobic liquid to form a hydrophobic phase and the aqueous phase comprises a plurality of polymers dispersed in water, wherein the plurality of polymers have hydrophilic functional groups that interact with the aqueous phase and hydrophobic moieties that interact with the hydrophobic phase and are chosen from the group consisting of:

polyvinyl acetate polymer, polyvinyl alcohol polymer, and polyacrylic acid polymer or an ester thereof.

2. The water-based colorant of claim 1, wherein the colorant is a paint, ink or dye.

3. The water-based colorant of claim 1, wherein the semiconductor nanocrystals are group II-VI, III-V, IV-VI, or I-III-VI binary, ternary, or quaternary semiconductor nanocrystals which emit in the UV, visible, or infrared range.

4. The water-based colorant of claim 1 which can be detected after 30 days of exposure to sunlight.

5. The water-based colorant of claim 1 which can be detected after 90 days of exposure to sunlight.

6. A method of making the colorant of claim 1, comprising the steps of:

dispersing semiconductor nanocrystals in a hydrophobic solvent to form a dispersion;

adding the dispersion to a mixture of water and a polymer;

subjecting the mixture to an emulsifying process to form an emulsion; and mixing the emulsion with another water-based colorant, the other water-based colorant being chosen from the group consisting of: a paint, an ink, and a dye.

7. The method of claim 6, wherein the emulsifying process is sonication or high shear mixing.

8. A method of using the colorant of claim 1, comprising: applying the colorant to a substrate.

9. The method of claim 8, wherein the substrate is an article of clothing, or other object in need of detection.

* * * * *